Dec. 23, 1969             G. B. KEITH             3,485,120
METHOD AND APPARATUS FOR CUTTING ELONGATED MATERIAL
Filed Sept. 8, 1966             2 Sheets-Sheet 1
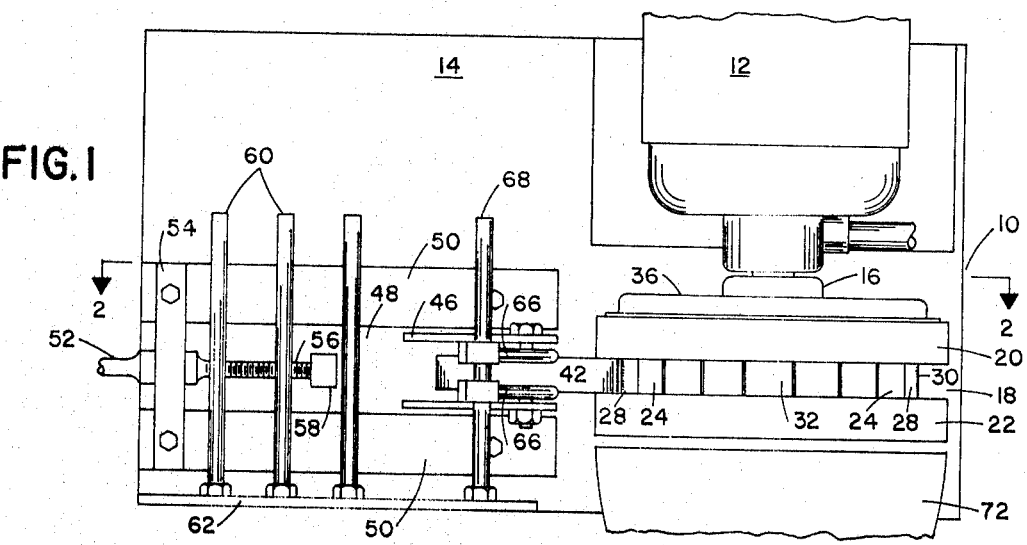
GARLAND B. KEITH
INVENTOR.
BY William J. French
George P Chandler
ATTORNEYS Dec. 23, 1969     G. B. KEITH     3,485,120
METHOD AND APPARATUS FOR CUTTING ELONGATED MATERIAL
Filed Sept. 8, 1966     2 Sheets-Sheet 2

GARLAND B. KEITH
*INVENTOR.*

BY *William J. French*
*George P Chandler*
ATTORNEYS

United States Patent Office 3,485,120
Patented Dec. 23, 1969

3,485,120
METHOD AND APPARATUS FOR CUTTING ELONGATED MATERIAL
Garland B. Keith, Kingsport, Tenn., assignor to Eastman Kodak Company, Rochester, N.Y., a corporation of New Jersey
Filed Sept. 8, 1966, Ser. No. 577,930
Int. Cl. B26d *1/40*
U.S. Cl. 83—37         29 Claims

ABSTRACT OF THE DISCLOSURE

Method and apparatus by which elongated material can be cut into shorter lengths whereby the material is fed to a plurality of knife edges, the inner layer being extended across and in contact with adjacent knife edges, with a pressure being applied to the inner layer to force the inner layer against the knife edges thereby cutting the inner layer while retaining the inner layer in its extended manner across the adjacent knife edges.

This invention relates to an apparatus and method for cutting continuous, elongated material into shorter lengths having predetermined dimensions. More particularly this invention relates to an improved method and apparatus for cutting continuous filamentary material or tow into fibers of predetermined dimensions and at a high rate of production.

Many types of cutting devices and methods for dividing elongated material into short lengths are known. While some of these devices perform with a reasonable degree of satisfaction at lower speeds, they all have inherent faults when run at higher production rates and especially when the cutting of continuous filamentary material into relatively short fibers is involved. For example, there is in these prior art devices at some time during the cutting cycle, a movement of the cutting surface longitudinally of the fiber. Such longitudinal movement, although of short duration, occurs with great impact and at very high rates of speed. This non-cutting contact between the fiber and the cutting edge is highly undesirable for a number of reasons. First, the lengthwise motion of filaments with the respect to the knife edge causes dulling of the edge and, hence, short knife life. For example, blade life on prior art cutters is generally about 27 minutes when cutting polyester fiber tow having approximately 450,000 total denier. Another undesirable result is that knife dulling caused by lengthwise or longitudinal motion causes the generation by friction of higher than usual amounts of heat. Oftentimes the amount of heat generated is sufficient to cause the ends of the adjacent fibers to fuse together, a condition which from a quality control standpoint is highly undesirable. In addition, rapid blade dulling necessarily results in a large amount of machine maintenance time for blade changing. Since the production of fibers is a continuous process, other equipment must be provided to handle the oncoming product. Other economic disadvantages of operating a machine which is quite often out of service are numerous.

Other prior art cutting apparatus is complicated by the number of machine parts which must be moved simultaneously to produce relatively short fibers such as staple fibers. One widely used machine includes two slotted, contacting rubber rollers and a rotating assembly of knives, all of which must be precisely synchronized to cut the fibers to the desired lengths while avoiding damage to the apparatus.

Some efforts have been made to overcome the shortcomings of prior art cutters. For example, in order to alleviate the welding or fusing of fibers to a degree, the filamentary material or tow is cut while wet. Thus, excess frictionally produced heat is dissipated by evaporation of the wetting agent. This solution, however, adds additional problems in that the wet staple fibers produced is expensive to dry and requires the addition of equipment and processing steps to the production line.

Another attempt to overcome the disadvantages of prior art cutters is illustrated in U.S. Patent No. 2,745,-491 to Sonneborn et al. The device disclosed in this patent severs continuous filamentary material into short lengths by wrapping it around a rotating drum which is in contact with a cutter roller. The problem of dulled cutters, while alleviated somewhat by this invention, is not solved, however, since the knife edges may contact the opposing drum surface.

Other disadvantages of prior art cutting apparatus involve changes in the character of the material being processed. For example, some of the presently utilized filament cutting devices are incapable of passing or cutting knots while others are susceptible to damage if the feed of material is interrupted for any reason. Furthermore, conventional cutting apparatus of the prior art is incapable of processing undrafted filaments or tow i.e. tow that has not been oriented in crystalline structure by drafting. In other words, most cutters of the prior art, when attempting to cut undrafted tow, the tow tends to become stretched as a result of the lengthwise motion caused by the operation of cutting. Conventional cutting apparatus will also, at times, pass filaments which are not cut or which are cut to non-uniform lengths, again creating a quality control problem.

According to the present invention, the above enumerated difficulties and shortcomings are overcome by lightly binding or wrapping the elongated material or filaments to be cut in touch contact with the cutter blade before severing is undertaken. In this manner there is no significant impact of blade against material or movement of the blade relative to the material prior to cutting. This is accomplished by wrapping the material around a reel-like structure formed by a plurality of cutting blades spaced apart a distance substantially equal to the lengths to be cut and secured to a rotatable mounting member. The cutting edges of the blades form a circular pattern around an extend radially outward from the axis of rotation of the mounting member so that as the material to be cut is fed thereon under slight tension, it is wrapped around the reel-like member in touch contact with the cutting edges. The wrap, consisting generally of at least one layer, has its innermost strands of filaments forced into contact sequentially with the blade edges by a pressure applying device, generally a roller or rollers, mounted adjacent the reel-like member. The pressure applying device does not contact the knife edges or the spaced flanges or flange like elements adjacent the reel. The blade edges, flanges and pressure applicator form in combination a pressure chamber from which the material contained therein tends to escape at the point where the highest unit pressure exists between the chamber confines and the material itself. This point of highest unit pressure is not through the pressure applicator surface or the flat surfaced flange walls, but past the minutely small area of the blade edge itself. Hence, a portion of the material to be cut approximately equal to the amount being fed to the cutting assembly will be severed as each succeeding knife passes under the pressure applying device. Fine fiber length or staple length adjustment is provided by varying the distance between the cutting edges and the pressure applicator so that the outside diameter of the wrap and hence the amount of the material fed to the assembly during each rotation can be changed. The remainder of the pack will be held firmly against the blade edges, trapped by the several outer layers. While particularly useful in cutting filamentary material, this novel apparatus can also be utilized to cut films, tapes, wires or strips of nearly any material possessing sufficient flexibility to be wound in the above described manner.

Accordingly, it is an object of this invention to provide cutting apparatus for severing continuous material into shorter lengths which is simple to operate, requires relatively litle power to drive, is inexpensive to build and maintain and will operate without significant blade wear for extended periods of time.

Another object of this invention is to provide an improved staple or staple fiber cutter which will operate at an unusually high rate of production while avoiding the problems of blade wear and excessive heat generation which can cause fused fibers during the cutting process.

A still further object of this invention is to provide cutting apparatus which will produce staple fibers cut in accurate, substantially uniform lengths.

Yet another object of this invention is to provide an improved cutting apparatus in which continuous material can be cut into lengths which are adjustable within precise limits.

Yet a still further object of this invention is to provide a cutting apparatus which is capable of cutting continuous material into mixed lengths in a predetermined pattern and ratio.

A still further object of this invention is to provide a method for producing staple fiber at a high rate of production and with precisely controlled dimensions.

These and other objects and advantages of this invention will be more apparent upon reference to the following specification, appended claims, and drawings wherein:

FIGURE 1 is a side elevational view of the cutting apparatus according to the instant invention, illustrating the relationship between the various elements thereof and showing a preferred cutting reel configuration;

FIGURE 2 is a view taken along line 2—2 of FIGURE 1 and showing the specific relationship between the cutting reel, the pressure applicator, and the material being severed;

FIGURE 3 is an enlarged detailed, fragmentary view taken along line 3—3 of FIGURE 2 showing the manner in which the knife blades are secured in the cutting reel according to one embodiment of the invention;

Figure 4:
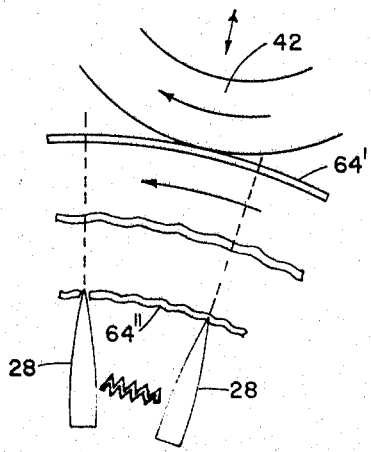
FIGURE 4 is an enlarged, fragmentary, detail view showing the relationship between the blades, the material being severed and the pressure applicator at the point of cutting.

In order to better understand the construction and use of this novel cutting apparatus, it will be described in connection with the severing of continuous filamentary material into staple fibers. It is to be understood, however, that various other uses may be made of this novel apparatus. The disclosed cutting device, for example, can be equally useful in processing any elongated material such as strips, ribbons, tapes, film, wire, etc. Specifically, for instance, film trim may be processed on the novel cutter in which case a densified product suitable for easy handling and re-extrusion is produced. Other uses will be readily apparent to those skilled in the art.

With continued reference to the accompanying figures wherein like numerals designate similar parts throughout the various views, and with initial attention directed to FIGURE 1, reference numeral 10 designates generally a cutting apparatus constructed according to the invention including a driving motor 12 mounted on a base 14 with its output shaft 16 connected in a suitable manner to a cutting reel or assembly designated generally by reference numeral 18. While the means for supplying driving power to the cutter is described as a motor it may as well consist of a gearbox receiving power from a rotating shaft common to several machines.

The cutting reel or assembly 18 consists of a mounting member including a disc 20, to which the output shaft 16 is removably connected, and a mounting ring 22 both of which are formed of generally flat plates of suitable material. As best shown in FIGURE 3, the mounting disc 20 and the mounting ring 22 are secured together in spaced, parallel relationship by a plurality of U-shaped connector lengths 24 which are secured in position by any of a number of well known expedients such as, for example, furnace brazing. A narrow slot 26 extends through both mounting disc 20 and mounting ring 22 as well as each connector length 24 for a purpose to be hereinafter more fully described. As shown in FIGURE 2, the connector length 24 are normally secured between the mounting disc 20 and the mounting ring 22 at equal distances radially outwardly from the shaft 16, which also defines the axis of rotation of the cutting reel 18. The circumferential spacing between connector lengths 24 is determined by the staple length desired as will be fully discussed hereinafter. While the device described above is a preferred construction, a configuration in which the ring 22 is not secured to mounting disc 20 by connectors 24 can be successfully utilized when the material to be cut is not excessively heavy wherein the clamped knife blades 28 are the sole structural tie between disc and ring.

The preferred manner of mounting the knife blades 28 is illustrated in FIGURES 1–3. As shown therein the knife blades 28 are removably mounted or inserted in slots 26 in connector lengths 24 with the cutting edge 30 extending radially outward. Since the connector lengths are disposed radially from the output shaft 16 and the axis of rotation of the cutting assembly 18, the knife blades 28 are likewise disposed. The width of blades 28 from cutting edge 30 to back is substantially less than the radial distance from the axis of rotation of the cutting reel 18 to the edge 30. Thus, the mounting disc 20, the mounting ring 22, and connector lengths 24 in which blades 28 are supported form an open ended compartment 32 within the cutting reel 18. The purpose and function of the compartment 32 will be described hereinafter in connection with the discussion of the mode of operation of this novel cutting apparatus.

In a preferred embodiment of the invention as specifically illustrated in FIGURE 3, the knife blades 28 are of such a length usually slightly more than twice the distance between disc 20 and ring 22 so that they will extend through a plurality of radially extending slots 34 formed in the mounting disc 20 to a point above its surface. Thus, blades 28, which simply rest within slots 26 in connector lengths 24 are readily removable from the cutting reel 18. An annular cap 36 protects the upper end of blades 28 as well as the operator attending the apparatus. The cap 36 is secured to the mounting disc 20 by suitable means such as thumb screws 38. When screws 38 are removed the cap 36 can be rotated relative to disc 20 so that individual blades 28 can be removed from the cutting reel 18 by aligning them with a slot 40 formed in the side of cap 38. Thus, as the knife edge 30 on a blade 28 becomes dulled through usage it can be easily replaced or, if the upper end has not yet been utilized, turned end for end to present a fresh, sharp cutting surface.

As best shown in FIGURES 1 and 2, a pressure applicator 42 of the rotatable type such as a wheel or roller is mounted on a shaft 44 secured to a bifurcated bracket 46 which in turn is supported on a movable slide 48 fitted into machined ways 50 secured to the base 14. Regulated movement of the slide 48 is accomplished by a lead screw 52 rotatably secured in a pillow block 54 fixed in position relative to machined ways 50 and thus to the base 14. One end 56 of lead screw 52 is threaded into an appendage 58 integral with or otherwise fixed on the surface of the movable slide 48 so that rotation of screw 52 will cause slide 48 to move relative to machined ways 50 and base 14. This structure, a lead screw actuated slide and ways assembly well known in the art, provides for movement of pressure roll 42 relative to cutting reel 18 and minute adjustment of the space between it and cutting edges 30. The reason for such a minute adjustment will become more apparent hereinafter in connection with the discussion of the mode of operation of this device.

A plurality of finger guides 60 or others well known in the art extend outwardly from a plate 62 secured at right angles to the base 14. The finger guides 60 shape the incoming filamentary tow 64 into a flattened tape or band. From the finger guides 60 the filamentary material or tow passes through rounded edge guides 66 which are pivotally mounted on an elongated rod 68 secured, as are finger guides 60, to plate 62. Guides 66 serve to control the width of the flattened tape band 64 so that it will wind snugly between mounting disc 20 and mounting ring 22 of the cutting reel 18. In addition to flattening the incoming tow 64, the finger guides 60 also serve as a friction brake to place the tow under a controlled amount of tension as it is fed into the cutting reel 18.

In operation of this cutting apparatus, the incoming filamentary tow which has been flattened into a tape on finger guides 60 and shaped by the edge guides 66 is fed into the rotating cutting reel 18 and wrapped therearound between mounting disc 20 and mounting ring 22. Thus, as shown in FIGURE 2, the tow is in touch contact with cutting edges 30 on knife blades 28 which form the bottom of reel 18. The tow 64 is wrapped upon itself in layers until the distance between knife edges 30 and pressure roll 42 is filled. As the cutting reel 18 rotates under the influence of motor 12 or other drive means, the feed of filamentary tow 64 continues causing pressure to build up within a chamber defined by the pressure roll 42, mounting disc 20, mounting ring 22, and the adjacent knife edge 30 which, at a point in time, is closest to the pressure roll 42. This pressure chamber is clearly shown in FIGURE 2 and identified by reference numeral 70. It is to be understood, however, that this pressure chamber 70 is formed with any knife edge 30 as the cutting reel 18 rotates, not just the particular chamber identified in FIGURE 2. The pressure continues to mount in magnitude until some of the filaments will be forced to escape the pressure chamber at the point where the highest unit pressure exists between the chamber confines and the filamentary pack itself. Obviously, the escape route is not through the gently radiused pressure roll surface or the flat walls of mounting disc 20 or mounting ring 22, but past the minutely small area of the cutting edge 30 itself. Hence an inward portion of the filamentary pack approximately equal to the feed of the oncoming band of tow 64 will be cut as each succeeding cutting edge 30 passes under the pressure roll 42. The remainder of the pack formed by the several layers will be held firmly against the cutting edges 30 trapped by several tensioned outer layers, to be cut in turn as the pressure again rises in the before described chamber. As the tow is severed the staple fibers pass between the knife edges 30 into the open ended compartment 32 and pass therefrom through the aperture in mounting ring 22 urged by air jet, vacuum, gravity, or other suitable means into a collecting funnel 72.

Generally speaking it is preferred that the cutting edges be spaced at equal radial distances from the axis of rotation of the reel 18 so that the innermost layer will be completely divided into a number of lengths during one rotation. This distance can be staggered, however, so that the blades form some closed geometrical figure other than a circle. In this manner, a particular layer will be severed into a plurality of lengths during one rotation with these lengths being themselves divided into a plurality of lengths during subsequent reel rotations.

Having described the above novel apparatus and method, a number of advantages over prior art devices and methods become apparent. For one, the tow is carried in touch contact with the blade before cutting, receiving only a gentle, padded nudge as it is urged against and past the knife edge by the pressure roll thereby eliminating the slashing impact of previous cutters having the ability to sever high strength yarns such as polyesters which often produces sufficient frictional heat to weld the ends together. Since there is no heat producing impact, it is not necessary to wet the fibers prior to cutting or to subsequently dry them. Further, inasmuch as the fibers can escape from the pressure chamber 70 only when cut, long ends are an impossibility. Because of the wrapping, there is no movement of the tow band longitudinally of the filaments across the knife edge to cause dulling and shortening of knife life. In this regard it has been found that knife life is increased more than twelve times over that of previous polyester tow cutting apparatus. The normal winding tension of the tow band also tends to help to do the cutting work and in certain instances, while cutting fibers requiring high tension, a near balanced condition may exist where all the cutting work is accomplished because of the winding tension and the pressure roll thus acts simply as an idler.

The cutting aparatus which is the subject of the instant invention will cut filamentary tow having three times the total denier of that which current cutting devices are capable of handling. Even when the higher denier tow is being processed, horse power requirements of the instant cutter are about half that of previous apparatus. This results from the utilization energy normally used in contacting, slotted rubber covered rolls which feed and hold the filamentary material as it is cut in the prior art devices. These rolls are in compressive contact and, since the resilient covering is very firm, considerable work is expended merely in accomplishing the desired interrelationship between the rolls.

Another significant advantage of my novel apparatus and method is the ability to cut staple fibers having square-sheared ends. This is contrastable with the gradual, pointed, shear produced on current cutting apparatus which causes swirls in the resultant yarn and hence what are known as neps in the woven cloth. As is well known in the textile industry, these neps produce highly undesirable highlights in the finished product.

In addition to the savings in time resulting from the significantly increased blade life of the novel apparatus and method of this invention, the necessity for constant operator vigilance has been practically eliminated. This results from the fact that applicant's cutting apparatus has been found to pass knots formed in the tow without damage to any of the elements thereof. In previous cutters, knots cannot be passed and if one is encountered and not detected by the operator, substantial damage to the machinery will result. Furthermore, if the flow of tow should be interrupted for any reason no damage will be done to applicant's cutting device while significant damage can occur in such a circumstance in prior art cutters.

A very important advantage which accrues from the utilization of the above described cutting apparatus and method is its ability to cut continuous materials into shorter lengths, such as staple fibers having a uniform length. I have discovered that the length of staple cut on this apparatus is dependent essentially on two factors; namely, the outside diameter of the tow wrapped around the cutting reel 18 and the number of blades disposed along the reel bottom. The amount of tension under which the filaments are fed to the cutter is a minor factor in determining staple length where crimped filaments, and this is usually the case, are being severed. All that is required for proper operation is sufficient tension to temporarily lessen the crimp in the filaments which is relatively little because of the inherent flexibility of textile materials. As for the upper limit of tension which can be applied, it should not be so great as to change the character of the filaments as by permanently removing the crimp, reducing denier by stretching, etc. It is accurate to say, therefore, that the magnitude of tension on the tow as it is fed to the cutting reel can be varied over wide limits without appreciably affecting staple length.

It is apparent that if the blades 28 are always disposed on a reel having the same diameter, an increase in the number of blades will result in more narrow spaces therebetween and shorter staple length; and, conversely, a decrease in the number of blades used will result in wider spaces therebetween and, thus, longer staple length. A product having staple fibers of various lengths in predetermined ratios can be produced merely by manipulating the position of the blades to provide some blades which are widely spaced and some which are closely spaced.

The effect on staple length produced by varying the outside diameter of the filamentary tow pack in accordance with my invention is explainable in the following manner. The outermost layer is the layer closest to the tension producing finger guides 60 and is, therefore, under the greatest tension. The crimp in the fibers of the outer layer is, therefore, more thoroughly decreased. In the layers of the filamentary tow pack closest to the knife edges the tension is relieved somewhat because these layers, while having a total length equal to that of the outer layer, have been forced into spirals of smaller and smaller circumferences by the pressure roll acting on the outermost layer. By way of illustration the filamentary tow 64 is under maximum tension in the outer wrap as illustrated in FIGURE 4 and under substantially zero tension at 64″ in the pressure chamber 70 as previously described. Therefore, the fibers in the outermost layer are substantially devoid, temporarily, of crimp while the fibers actually in the pressure chamber 70 have recovered to the extent intended in the finished fiber. It should be understood that the tow length in the innermost wrap is the same total length as that of the outermost wrap but differs therefrom in that it has regained its original crimp completely while the tensioned filaments of the outermost wrap are substantially devoid of crimp. It is seen therefore that the length of the tensioned outermost wrap determines the total length of all wraps and therefore the length of material to be processed during one revolution of reel 18.

Assuming constant crimp per unit length and sufficient tension to temporarily lessen crimp cut staples length can then be determined by the formula:

$$\frac{\text{Outside diameter of Winding X } \pi}{\text{Number of equally spaced blades}} = \text{Cut length}$$

Since, as shown above, the outside diameter of the tow wrap is a factor in fiber length or staple length, control of this dimension is used in accordance with my invention to vary such length. This control is accomplished by increasing or decreasing the space between cutting edge 30 of blades 28 and the pressure roll 42. As described above, pressure roll 42 may be moved mechanically through rotation of lead screw 52. Thus, the outside diameter of the tow pack on the cutting reel 18 may be varied, and, hence, the staple length can be adjusted while the machine is in operation or before cutting is commenced. Moving roll 42 away from reel 18 increases wrap diameter and thus staple length while movement of the roll toward the reel effects a decrease in wrap diameter and staple length. Of course, the basic staple length is determined by the spacing of the knife blades 28, and the adjustment to be effected by movement of the pressure roll 42 produces changes on the order of several thousandths of an inch, with the variation being greater with the longer staple lengths. It is apparent that the above discussion and explanation is applicable to the continuous materials heretofore indicated as well as other filamentary materials.

Reference has been made repeatedly to knife blade spacing and some further discussion of this aspect of the invention is believed to be in order. Staple lengths have been fairly well standardized throughout the textile industry and most are evenly divisible into a circle having a circumference of 60 inches. For this reason it is preferred that the size of cutting reel 18 be such as to accommodate a tow pack outside diameter of this size within its borders. This is the basic circle size and will be adjusted upwardly and downwardly in accordance with factors to be discussed below.

Using as an example 1½ inch staple as a desired end product, the blade spacing will be determined in the following manner. If the fiber is uncrimped forty blades will be disposed with their cutting edges lying on a circle having a circumference of very slightly less than 60 inches and will be evenly spaced. If the fiber is crimped, however, allowance must be made for the fact that at the time of cutting, the fiber is in its contracted or crimped position as described above. Thus, since staple is measured uncrimped, allowance must be made in blade spacing to compensate for the fact that the crimped length of the fiber when it is cut is less than 1½ inches. For standard crimped staple of this length the allowance has been found to be approximately 100 thousandths of an inch so that the blade spacing is 1½ inches less 100 thousandths of an inch. Therefore the cutting edges are equally spaced around a circle having a circumference which will, when divided by 40, equal 1.40 inches. Forty is the number of blades utilized and is selected arbitrarily. Other quantities of blades as well as reel circumferences can be utilized with the spacing computed in the above manner.

The blade spacing and adjustability features described above will result in staple fibers having a length of 1.47 inches plus or minus 30 thousandths of an inch. In prior art cutting apparatus variations of ⅛ to ¼ of an inch on either side of 1½ inches are not uncommon, and this variation has become acceptable to the industry. Since the staple length is more uniform and more closely controllable in the novel cutting apparatus which is the subject of this invention, the blades 28 can be set to cut staple on the low side of the acceptable range with confidence that a product within quality control limits will be produced. If for example, the blades are set to produce staple 1.47 inches long, the length produced will still be within the acceptable limits for standard 1½ staple fibers. This has tremendous significance for the industry and is a significant advantage of this novel cutting apparatus since it will result in an increase in the amount of goods produced from staple cut on the apparatus disclosed herein as compared to staple produced on other cutting devices. Oftentimes, this will be the difference between making a profit or sustaining a loss in the highly competitive textile industry. A uniform product is also easier to process in subsequent manufacturing steps such as yarn spinning and is greatly preferred by the spinning industry.

Figure 5:
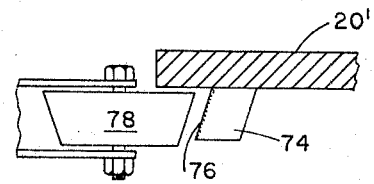
FIGURE 5 is an enlarged detailed fragmentary view, partly in cross section, showing the relationship between the pressure applicator and the cutting reel according to another embodiment of the invention.
Figure 6:
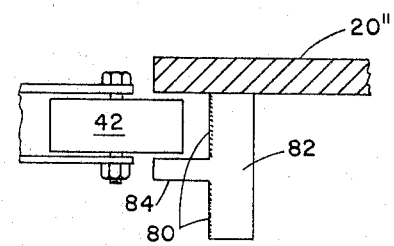
FIGURE 6 is a view similar to FIGURE 5 showing the pressure applicator and cutting reel according to still another embodiment of the invention.
Figure 7:
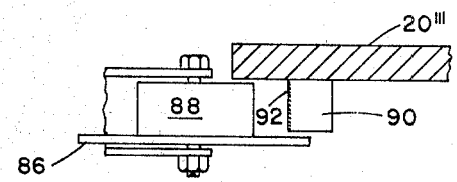
FIGURE 7 is a view similar to FIGURE 5 showing the pressure applicator and reel configuration according to a still further embodiment of the invention.

The preferred cutting reel assembly 18 is shown in FIGURES 1 through 4. Other operable embodiments of the invention are shown in FIGURES 5 through 7. In FIGURE 5 a plurality of knife blades 74 are disposed on a mounting disc 20′ in a circular pattern as described hereinbefore. The cutting edge 76 of knife blade 74 is canted outwardly at an angle so that the tension under which the fibrous tow is fed will cause the tow pack to be maintained on the knives as a bundle snugly disposed against mounting disc 20′. The outer surface of pressure roll 78 is similarly canted so as to maintain contact with the fibrous bundle evenly along its outer wrap.

In the embodiment of the invention illustrated in FIGURE 6, the tow wraps are sustained in touch contact with the cutting edge 80 of blade 82 as secured to disc 20″ by blade extension 84. When extensions 84 on each of the blades 82 are taken in combination they form a reel flange which is open rather than solid as in the embodiments illustrated in FIGURES 1–3. When a cutting edge becomes dull it can be turned end for end to present a fresh cutting surface.

In the embodiment of the invention illustrated in FIGURE 7, a flange 86 is formed integrally, or otherwise attached to the pressure roll 88. This configuration serves to extend the pressure chamber beyond the width of the blade 90 alleviating somewhat the limitations of the embodiments of FIGURES 4 and 6. As in other embodiments, the blade 90 includes a cutting edge 92 and is secured to a mounting disc 20″.

While it is preferred that the cutter rotates about a vertical axis as shown, it will be appreciated that any other desired orientation can be utilized with the only difference being in the manner in which the cut staple fibers or other cut materials are removed from the cutting assembly. For example, the cutter can be arranged to rotate about a horizontal axis with the cut fibers being removed by an exhaust system disposed in the center of the cutting assembly.

From the above detailed description it is apparent that apparatus for cutting elongated material into shorter lengths can be produced. Furthermore, a novel method for accomplishing this end result has been disclosed. The novel apparatus and method both have a number of advantages over prior art devices of this character. The apparatus is simple, easy to operate, requires less power, and is much less expensive to fabricate than prior art staple cutters. Relative motion lengthwise between the material to be cut and the cutting edge has been eliminated thereby vastly increasing blade life. The elimination of sliding and impact friction has disposed of the problem of fused ends and obviated the necessity for wetting and subsequent drying of the fibers.

Perhaps the most significant advantage derived from the instant invention is that it will produce a staple fiber of uniform length within closely controllable tolerance. Whereas in prior art devices the tolerance was approximately plus or minus a tenth of an inch the novel cutting apparatus which is the subject of this application will cut within plus or minus 30 thousandths of an inch. This is highly significant to the textile industry since processors of staple fibers can now be confident of staple fiber length within a very narrow range of tolerances. This allows an increase of up to about 2% in the amount of end product composed of staple fiber produced from this new apparatus and by this new method as opposed to the apparatus and methods formerly used. Two percent will often be the difference between a profit and a loss in the highly competitive textile industry. The uniformity of staple fiber length is created in part by the ability to very accurately adjust such length while the cutter is in operation, an adjustment which has not heretofore been available.

By utilizing the novel method and apparatus which is the subject of the instant application the filament ends are cut squarely as opposed to the angular shear-tear which resulted from prior art apparatus. A square cut filament when formed into yarns, which are woven into a fabric, eliminates the undesirable neps which are otherwise formed. Thus, higher quality fabrics can be produced at the same, or lower, price than is now possible.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patents is:

1. A method for cutting elongated material into a number of shorter lengths comprising the steps of:
   continuously feeding the elongated material to a plurality of knife edges and extending the inner layer of the material across and in contact with each two adjacent knife edges of the plurality of knife edges so that the inner layer is in touch, lightly tensioned contact with the knife edges;
   applying a pressure against the material that is outwardly of the inner layer thereby forcing said inner layer against said knife edges and while retaining the inner layer in extended manner across said adjacent knife edges cutting said inner layer into said number of shorter lengths.

2. A method for cutting elongated material according to claim 1 wherein said knife edges are mounted in spaced relationship and define a closed geometrical figure with the elongated material being wrapped thereabout.

3. A method for cutting elongated material according to claim 2 wherein a radially inward directed force is applied to the outer surface of said material forcing the inner surface thereof over said cutting edges.

4. A method for cutting elongated material according to claim 3 wherein said knife edges are rotated as a unit.

5. A method according to claim 4 wherein said elongated material is continually fed onto said rotating knife edge unit.

6. A method for cutting elongated material according to claim 1, and wherein said inner layer of material is forced against and is cut by one knife edge at a time.

7. A method for cutting elongated material according to claim 4, and wherein a predetermined amount of said material is wrapped around said rotating knife edge unit to control the longitudinal dimension of said lengths cut.

8. A method of cutting filamentary material into a number of lengths of controlled dimensions comprising the steps of:
   (a) spirally winding said filamentary material into a coil having a plurality of layers the innermost of which is placed in touch contact with a plurality of spaced knife edges;
   (b) maintaining contact between said innermost layer and said knife edges with no relative movement therebetween longitudinally of said filamentary material;
   (c) applying a force on the outermost layer of said material, said force being directed toward the innermost layer causing said innermost layer to move at an angle substantially perpendicular to its longitudinal axis thereby forcing said innermost layer past said knife edges and severing said filamentary material into lengths of controlled dimensions.

9. A method for cutting filamentary material into a number of lengths of controlled dimensions comprising the steps of:
   (a) spirally winding said filamentary material into a coil having a plurality of layers the innermost of which is placed in contact with a plurality of spaced knife edges;
   (b) rotating said knife edges and said plural layers about an axis, said axis being common to each of said knife edges;
   (c) maintaining contact between said innermost layer and said knife edges with no relative movement therebetween longitudinally of said filamentary material by applying tension to said material as it is wound thereby forming said layers into a compacted mass;
   (d) applying force on the outermost layer of said material at a point which is stationary relative to said axis, said force being directed toward said axis thereby causing said innermost layer to move at an angle substantially perpendicular to its longitudinal axis thereby forcing said innermost layer past said knife edges and severing said filamentary material into lengths of controlled dimensions.

10. Apparatus for cutting material into predetermined lengths comprising:
(a) a cutting assembly including a plurality of spaced apart knife edges secured to a mounting member at equal radial distances from a point on said mounting member thereby forming a reel, each of said radial distances in every instance being less than the distance from said point to the periphery of said mounting member, and said knife edges being canted relative to said mounting member;
(b) said cutting assembly having means adapted to receive successive wrappings of material to be cut in contact with a plurality of said knife edges so that no relative movement occurs between said material and said knife edges longitudinally of said material; and
(c) means for forcing said material between adjacent knife edges thereby severing said material into lengths of controlled dimensions, said means being a roller pivotally, spacedly mounted adjacent said knife edges with its outer surface formed to complement said canted knife edges.

11. Apparatus for cutting material into predetermined lengths comprising:
(a) a cutting assembly including a plurality of spaced apart knife edges secured to a mounting member at equal radial distances from a point on said mounting member thereby forming a reel, each of said radial distances in every instance being less than the distance from said point to the periphery of said mounting member, said knife edges being formed on a blade which extends outwardly from said mounting member and including a portion spaced from said mounting member extending radially outwardly from said point thereby forming a guide and a means for maintaining said material in contact with said knife edges;
(b) said cutting assembly having means adapted to receive successive wrappings of material to be cut in contact with a plurality of said knife edges so that no relative movement occurs between said material and said knife edges longitudinally of said material; and
(c) means for forcing said material between adjacent knife edges thereby severing said material into lengths of controlled dimensions, said means for forcing said material being a cylindrical roller pivotally, spacedly mounted adjacent said knife edges and extending into the space between said mounting member and said blade portion to thereby form a pressure chamber having said knife edge as one side whereby a high unit pressure will be formed along said knife edge to cause severing of said material.

12. Apparatus for cutting material into predetermined lengths comprising:
(a) a cutting assembly including a plurality of spaced apart knife edges secured to a mounting member at equal radial distances from a point on said mounting member thereby forming a reel, each of said radial distances in every instance being less than the distance from said point to the periphery of said mounting member and said knife edges extending perpendicularly relative to said mounting member;
(b) said cutting assembly having means adapted to receive successive wrappings of material to be cut in contact with a plurality of said knife edges so that no relative movement occurs between said material and said knife edges longitudinally of said material; and
(c) means for forcing said material between adjacent knife edges thereby severing said material into lengths of controlled dimensions, said means for forcing said material being a cylindrical roller pivotally, spacedly mounted adjacent said knife edges and terminating between said knife edges and the periphery of said mounting member, said roller including a flange spaced from said mounting member and terminating between said point and said knife edges thereby forming a pressure chamber having one of said knife edges as one side whereby a high unit pressure will be formed along said one knife edge to cause severing of said material.

13. Apparatus for cutting continuous, filamentary material into staple fibers comprising:
(a) a cutting assembly including a plurality of knife edges aligned in parallel relationship and spacedly secured to a mounting member at radial distances from a point on said mounting member, said radial distances being in every instance less than the distance from said point to the periphery of said mounting member;
(b) said mounting member including a disc spaced from a ring between which said knife edges extend thereby forming a reel with said knife edges along tthe periphery of the bottom thereof;
(c) roller means spacedly mounted adjacent said knife edge and adjustable toward and away from said point on said mounting member whereby variable thicknesses of filamentary material can be introduced between said roller means and said cutting assembly and forced through the spaces between said knife edges thereby severing said filamentary material into lengths of controlled dimensions.

14. Apparatus according to claim 13 wherein said mounting member is pivotally positioned so as to be rotatable with the axis of rotation passing through said point whereby said filamentary material can be continuously fed to said cutting assembly and wound in layers about said reel formed by said knife edges.

15. Apparatus according to claim 13 wherein said knife edges are formed along the outer edges of blades extending radially from said point as a center, the width of said blades from edge to back being less than said radial distance from said point to said knife edges thereby forming, with said ring and disc, an open ended compartment in said cutting assembly through which severed lengths can pass.

16. Apparatus for cutting continuous, filamentary material into staple fibers comprising:
(a) a cutting assembly including a plurality of knife spacedly secured to a mounting member and extending radially outwardly from a point on said mounting member, the outer edges of said blades being formed into cutting edges disposed at equal radial distances from said point, said radial distance being less than the distance from said point to the periphery of said mounting member, and the width of said blades being less than said radial distance;
(b) said mounting member including a planar disc spaced from a ring between which said knife blades extend in perpendicular relationship thereto thereby forming a flanged reel with said cutting edges along the periphery of the bottom thereof;
(c) said disc, ring, and knife blades defining an open ended compartment in said cutting assembly through which filamentary material cut into staple fibers can pass;
(d) said mounting member being supported so as to be rotatable about an axis passing through said point, said axis disposed perpendicularly to said disc and said rings;
(e) roller means mounted adjacent said cutter assembly and extending between said reel flanges as formed by said disc and said rings into closely spaced relationship with said reel bottom as formed by said knife edges to define therewith a pressure chamber, the axis of rotation of said roller means extending parallel to said axis about which said mounting member is rotatable;

(f) means for feeding said filamentary material into said cutting assembly under tension whereby said filamentary material is tightly wrapped about said reel formed by said disc, ring, and knife edges to a number of layers sufficient to fill said pressure chamber causing the unit pressure on said cutting edges to rise to a point at which said filamentary material is severable, thereby cutting it into lengths of controlled dimensions.

17. Apparatus according to claim 16 wherein said roller means is movable toward and away from said reel bottom whereby the number of layers of filamentary material which can be accommodated therebetween is adjustable to vary the outside diameter of said material wrapped about said reel thereby accomplishing staple length control.

18. Apparatus according to claim 17 wherein said means for feeding includes a pair of edge guides to direct said material between said reel flanges and a plurality of finger guides to apply tension to said filamentary material.

19. A method for cutting elongated material into a number of shorter lengths according to claim 5 wherein said radially inward directed force is produced by applying tension to said elongated material continually fed onto said rotating knife edge unit.

20. A method of cutting filamentary material into a number of lengths of controlled dimensions according to claim 8 wherein said force is applied to the innermost layer of said material by tensioning said filamentary material as it is wound into said coil.

21. Apparatus for cutting material into predetermined lengths comprising:

(a) a cutting assembly including a plurality of spaced apart knife edges secured to a mounting member;

(b) said cutting assembly having means adapted to receive successive wrappings of material to be cut in contact with a plurality of said knife edges so that no relative movement occurs between said material and said knife edges longitudinally of said material; and (c) means for forcing said material between adjacent knife edges thereby severing said material into said lengths of controlled dimensions, said means for forcing said material between adjacent knife edges comprising tensioning means for resisting the wrapping of said material about said cutting assembly.

22. A method for cutting elongated material into a number of shorter lengths comprising the steps of:

(a) pulling elongated material into a coil with incoming successive layers being formed radially outwardly of the coil;

(b) continuously cutting the inner layer of the elongated material into said number of shorter lengths; and (c) transporting the shorter lengths away from the center of the coil.

23. A method for cutting elongated material into a number of shorter lengths according to claim 22, and wherein a radially directed force is continuously applied against the outer said successive layers of material, and the inner layer of the elongated material is continuously cut at a location that is radially inwardly from said radially directed force.

24. A method for cutting elongated material into a number of shorter lengths according to claim 22, and wherein a radially directed force is continuously applied against said inner layer of longated material by tensioning said incoming successive layers of elongated material.

25. A method for cutting elongated material as defined in claim 1, and wherein said shorter lengths are continuously moved inwardly of said knife edges by subsequently cut shorter lengths of material and are then conveyed away from said knife edges.

26. A method for cutting running elongated material, whereby the material to be cut is contacted with at least one cutting edge characterized in that the cutting edge is moved within a predetermined closed path in the same direction and at the same speed as the material to be cut whereby the material is brought into contact with the cutting edge at a predetermined position with the material being wound continuously in a closed path to form several superposing layers, whereby each succeeding innermost layer is forced against the cutting edge thereby cutting the material in such a manner that the cutting force is exerted substantially at a right angle to the elongated material and the other layer serves as a cutting cushion.

27. A method according to claim 26 characterized in that the cutting edge is brought repeatedly into a predetermined succession of cutting actions.

28. A method according to claim 26 characterized in that a plurality of cutting edges is set in cutting action one after the other.

29. A method of cutting elongated material comprising winding a coil of said material with the innermost windings thereof bearing against a plurality of cutting blades, and continuing said winding while continuously forcing said innermost windings against said cutting blades to thereby cut said material.

References Cited

UNITED STATES PATENTS

| | | | |
|---|---|---|---|
| 37,446 | 1/1863 | Hull | 83—411 X |
| 1,196,986 | 9/1916 | Roney | 83—20 |
| 2,449,047 | 9/1948 | Anderson | 83—346 X |
| 2,664,160 | 12/1953 | Speakman | 83—341 |
| 2,719,336 | 10/1955 | Stotler | 83—913 X |
| 2,745,491 | 5/1956 | Sonneborn et al. | 83—913 X |
| 3,227,024 | 1/1966 | Krebs | 83—636 X |

FOREIGN PATENTS 890,411   9/1953   Germany.

JAMES M. MEISTER, Primary Examiner

U.S. Cl. X.R.

83—346, 913

UNITED STATES PATENT OFFICE
CERTIFICATE OF CORRECTION

Patent No. 3,485,120    December 23, 1969

Garland B. Keith

It is certified that error appears in the above identified patent and that said Letters Patent are hereby corrected as shown below:

Column 3, line 9, "litle" should read -- little --. Column 6, line 35, after "utilization" insert -- of --. Column 10, line 70, after "applying" insert -- a --. Column 12, line 47, after "knife" insert -- blades --. Column 13, line 46, before "lengths" cancel "said". Column 14, line 10, "longated" should read -- elongated --.

Signed and sealed this 26th day of May 1970.

(SEAL)
Attest:

Edward M. Fletcher, Jr.
Attesting Officer

WILLIAM E. SCHUYLER, JR.
Commissioner of Patents

REEXAMINATION CERTIFICATE (494th)

United States Patent [19]

Keith

[11] B1 3,485,120

[45] Certificate Issued Apr. 29, 1986

[54] METHOD AND APPARATUS FOR CUTTING ELONGATED MATERIAL

[75] Inventor: Garland B. Keith, Kingsport, Tenn.

[73] Assignee: Lummus Industries, Inc., Columbus, Ga.

Reexamination Request:
No. 90/000,739, Mar. 14, 1985

Reexamination Certificate for:
Patent No.: 3,485,120
Issued: Dec. 23, 1969
Appl. No.: 577,930
Filed: Sep. 8, 1966

Certificate of Correction issued May 26, 1970.

[51] Int. Cl.$^4$ .............................................. B26D 1/40
[52] U.S. Cl. .......................................... 83/37; 83/346; 83/913

[58] Field of Search ................... 83/18, 175, 346, 347, 83/913, 37, 38; 19/0.6, 0.62

[56] References Cited

U.S. PATENT DOCUMENTS

| | | | |
|---|---|---|---|
| 1,374,200 | 4/1921 | Grondahl | 83/323 |
| 2,307,721 | 1/1943 | Weirauch | 83/403 |
| 2,642,135 | 6/1953 | Regalia | 83/323 |
| 3,062,082 | 11/1962 | Keith | 83/411 R |

*Primary Examiner*—James M. Meister

[57] ABSTRACT

Method and apparatus by which elongated material can be cut into shorter lengths whereby the material is fed to a plurality of knife edges, the inner layer being extended across and in contact with adjacent knife edges, with a pressure being applied to the inner layer to force the inner layer against the knife edges thereby cutting the inner layer while retaining the inner layer in its extended manner across the adjacent knife edges.

REEXAMINATION CERTIFICATE ISSUED UNDER 35 U.S.C. 307

THE PATENT IS HEREBY AMENDED AS INDICATED BELOW.

Matter enclosed in heavy brackets [] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1-7, 9-19, and 21-25 is confirmed.

Claims 8, 26 and 29 are determined to be patentable as amended.

Claims 20, 27 and 28, dependent on an amended claim, are determined to be patentable.

8. A method of cutting filamentary material into a number of lengths of controlled dimensions comprising the steps of:
(a) spirally winding said filamentary material into a coil having a plurality of *radially extending* layers the innermost of which is placed in touch contact with a plurality of spaced knife edges;
(b) maintaining contact between said innermost layer and said knife edges with no relative movement therebetween longitudinally of said filamentary material;
(c) applying a force on the outermost layer of said material, said force being directed toward the innermost layer causing said innermost layer to move at an angle substantially perpendicular to its longitudinal axis thereby forcing said innermost layer past said knife edges and severing said filamentary material into lengths of controlled dimensions.

26. A method for cutting running elongated material, whereby the material to be cut is contacted with at least one cutting edge characterized in that the cutting edge is moved within a predetermined closed path in the same direction and at the same speed as the material to be cut whereby the material is brought into contact with the cutting edge at a predetermined position with the material being wound continuously in a closed path to form several *radially extending* superposing layers, whereby each succeeding innermost layer is forced against the cutting edge thereby cutting the material in such a manner that the cutting force is exerted substantially at a right angle to the elongated material and the other layer serves as a cutting cushion.

29. A method of cutting elongated material comprising winding a coil of said material with the innermost windings thereof bearing against a plurality of cutting blades, and continuing said winding while continuously forcing said innermost windings against *all* said cutting blades to thereby cut said material.

* * * * *